United States Patent [19]

Edmondson et al.

[11] 4,342,233

[45] Aug. 3, 1982

[54] LOAD DETECTING PROBE

[75] Inventors: Richard Edmondson; Dale A. Wisebaker, both of Tiffin, Ohio

[73] Assignee: The National Machinery Company, Tiffin, Ohio

[21] Appl. No.: 178,728

[22] Filed: Aug. 18, 1980

[51] Int. Cl.³ .............................................. G01L 1/22
[52] U.S. Cl. .................................................. 73/862.06
[58] Field of Search ........... 73/862.06, 862.48, 862.54, 73/862.55, 862.56, 862.57, 862.64, 862.65, 862.66, 862.67, 768, 786; 100/99

[56] References Cited

U.S. PATENT DOCUMENTS 3,444,390  5/1969  Breidenbach et al. .............. 307/116
3,805,604  4/1974  Ormond ....................... 73/862.65 X
4,171,646  10/1979  Dybel et al. ......................... 73/808

Primary Examiner—Jerry W. Myracle
Attorney, Agent, or Firm—Pearne, Gordon, Sessions, McCoy & Granger

[57] ABSTRACT

A sensing probe for monitoring working forces in compressive elements such as found in presses and other machine tools. The probe has an elongated configuration which allows it to be mounted at a point remote from its load sensing end and enables it to be conveniently used with a plurality of like probe units in relatively confined spaces. A wedge profile of its sensing end permits the probe to be preloaded in compression for an increase in accuracy and reliability.

21 Claims, 5 Drawing Figures

LOAD DETECTING PROBE

BACKGROUND OF THE INVENTION

This invention relates to apparatus for monitoring work forces in machine tools.

PRIOR ART

Advances in electronics have made it practical to continuously monitor conditions and operating parameters in machine tools. The instantaneous performance and/or conditions imposed on tooling measured and transmitted in the form of electrical signals can be used to detect incipient tooling failures and indicate the need for tool adjustment and otherwise reveal abnormal operating conditions. All such information can be utilized to reduce overall manufacturing costs by avoiding catastrophic machine failure, premature wear of machine elements and tooling, and the production of out-of-tolerance parts.

U.S. Pat. No. 3,444,390 to Breidenbach et al. and U.S. Pat. No. 4,171,646 to Dybel et al. disclose measuring devices for use on machine tools, such as forges, presses, and the like. Generally, such prior art devices are not sufficiently sensitive and/or physically constructed to be readily adapted for use in local areas of a machine in order to directly measure forces on the tools. For example, the transducer arrangements disclosed in these patents are incapable of directly measuring the working load on a tool. This incapacity to directly measure tool loading is particularly acute when it is desired to monitor the individual loads on a plurality of tools carried on a common base and caused to work simultaneously.

Ideally, apparatus for measuring working loads in a machine tool is adapted to be mounted in an area of the machine which is shielded to prevent physical damage through exposure to inadvertent impacts or contamination by debris, lubricants, and the like. At the same time, it is desirable that the load measuring apparatus be readily accessible for inspection, removal, and repair or replacement.

SUMMARY OF THE INVENTION

The invention provides a sensing probe adapted to extend laterally into a back-up zone through which compressive tool working forces axially project. A back-up zone, embodied as a tool support plate, for example, includes a laterally extending cavity for accommodation of the probe. The probe relies on physical contact with the wall of the cavity to sense forces acting on immediately adjacent tooling. The probe, elongate in configuration, is selective in its sensitivity so that it can be employed in a back-up member at a discrete point of limited area compared to the total projected area of the back-up member. Accordingly, several like probes, one for each tool station, can be utilized where a single back-up member supports a plurality of spaced tools.

As disclosed, the probe is arranged to sense relative closing movement, the result of compressive strain in the back-up support member, between opposing surface areas of the cavity accommodating the probe. In the illustrated case, the probe utilizes tapered surfaces to convert laterally applied probe clamping forces into preloading compression between contacting surfaces of the probe and cavity wall. Such preloading enhances signal accuracy and reliability.

Because of the simplicity of both its design and its requisite accommodations in the host back-up member, the probe arrangement is economical to manufacture and simple to install. For these considerations, and because of its relatively limited safety requirements, the probe has wide application in the machine tool field. As will be understood, the probe arrangement is readily adapted to existing equipment designs, and may even be retrofitted into existing hardware.

In the illustrated embodiment, a plurality of probes are disposed in a common tool back-up member supporting a series of regularly spaced tools. Each probe comprises a generally circular elongate plug fitted into a receiving cavity disposed laterally of the force axis at its associated tool station. The inner end of the probe and a surrounding area of the cavity are formed with complementary conical surface areas. These conical or converging areas coact in the manner of a wedge to compress, and thereby preload, the inner end of the probe when the latter is fully seated in the cavity. Means are provided to releasably lock each probe in a desired state of preloading and to facilitate return to this state subsequent to disassembly of the probe.

DESCRIPTION OF THE PREFERRED EMBODIMENT

Figure 1:
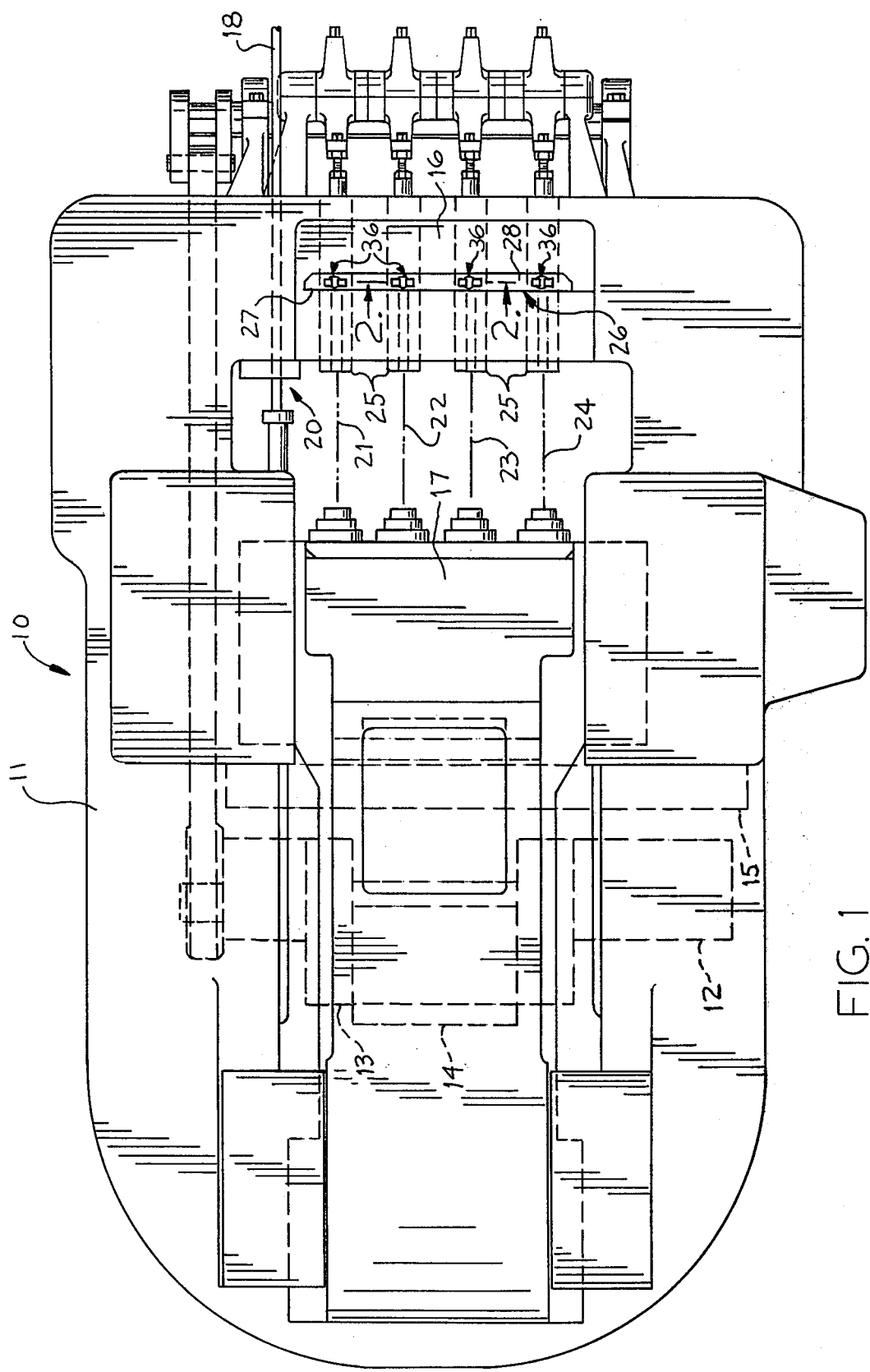
FIG. 1 is a plan view of a forging machine having a plurality of progressive die stations at which are provided individual load sensing probes constructed in accordance with the invention.
Figure 3:
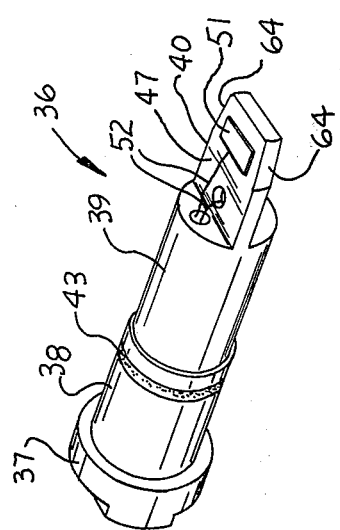
FIG. 3 is a perspective view of a typical load sensing probe.
Figure 4:
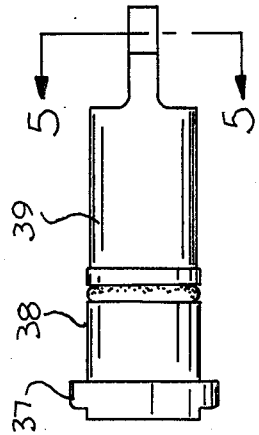
FIG. 4 is a side elevational view of the load sensing probe.
Figure 5:
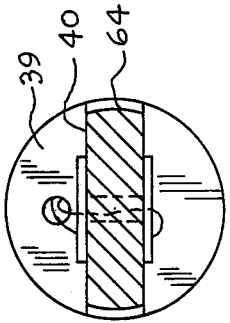
FIG. 5 is an end view of the load sensing probe, taken in the plane of the line 5—5 indicated in FIG. 4.

Referring to FIG. 1, the numeral 10 designates a forging machine representing but one of a variety of headers, forgers, presses, and other machine tools. The machine 10 includes a bed frame 11 of any suitable design. A main crankshaft 12 is journaled in the opposite sides of the bed frame 11 and is provided with a crank 13 having a connecting rod 14 journaled thereon. A countershaft 15 is geared to the crankshaft 12 for rotation at the same speed as the crankshaft. The bed frame 11 is provided at its forward end with a die breast 16, and within guideways formed in the frame a header slide 17 is mounted to reciprocate toward and away from the die breast 16. The connecting rod 14 is pivoted on the slide 17 to produce reciprocation thereof in response to crank rotation.

Wire or rod stock 18 is fed through the bed frame 11 by any conventional type of feed rollers or the like, and is sheared at a shearing station 20 into blanks. A shearing mechanism (not shown) such as that disclosed in U.S. Pat. No. 2,721,343, issued Oct. 25, 1955, shears off a blank and carries it into horizontal alignment with successive blank working stations 21–24. Transfer fingers (not shown) of a transfer mechanism such as shown in U.S. Pat. No. 2,026,823, issued Jan. 7, 1936, operate to grip blanks ejected from tooling dies 25 at these stations and progressively position the blanks in the front of the next station for subsequent operation. The transfer system is powered in timed relationship to the movement of the header slide 17 so that blanks are progressively moved to each of the die stations 21-24 at proper times in the reciprocation cycle of the slide 17.

Figure 2:
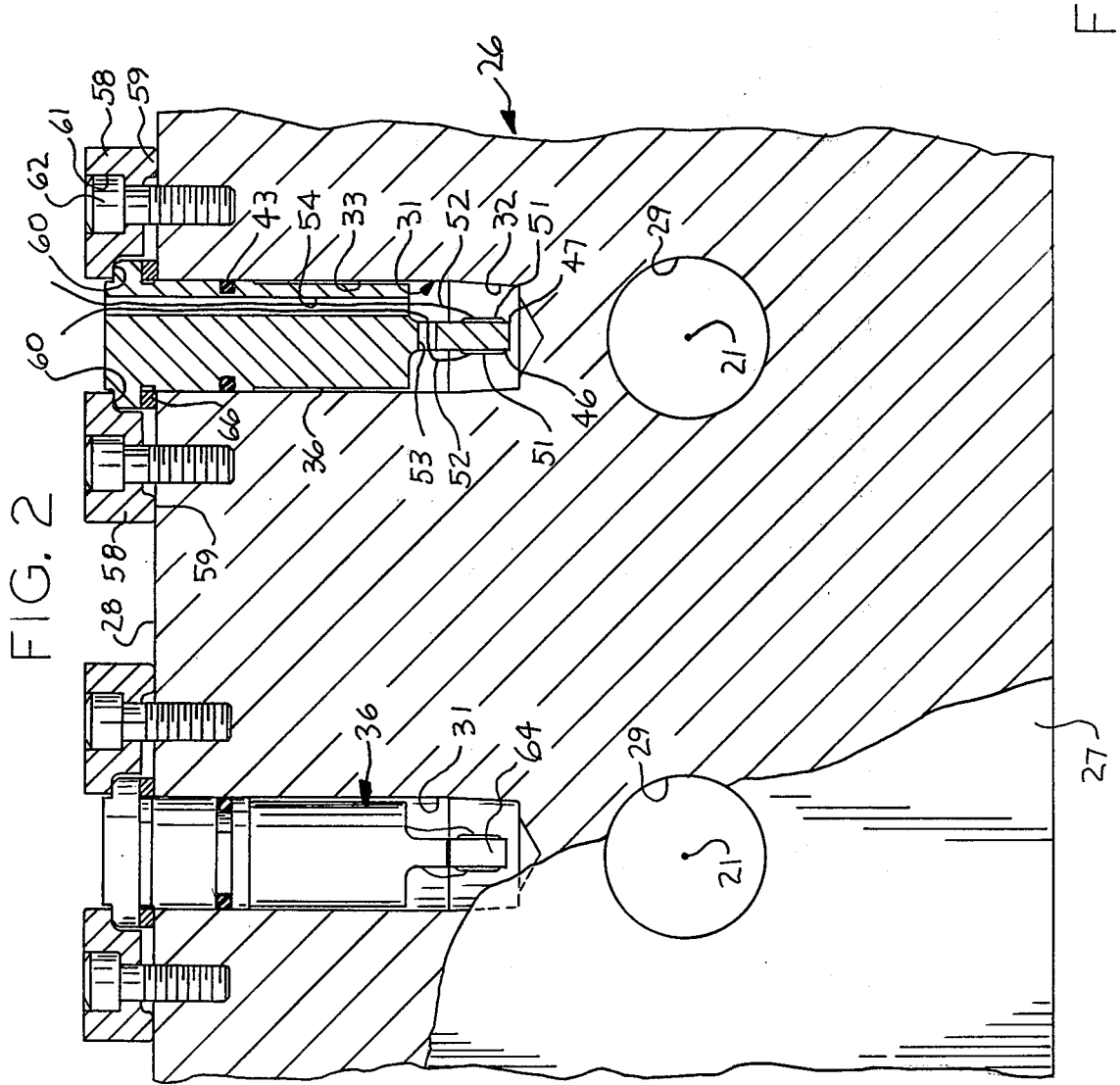
FIG. 2 is a fragmentary, cross sectional view of a die block tool back-up plate revealing a pair of load sensing probes of the invention mounted therein.

Removably fixed to the die breast 16 is a die block face plate 26, hereinafter sometimes referred to as a "tool back-up member." A working face 27 of the face plate 26 faces towards the header slide 17 and supports the tooling 25 at the successive stations 21-24 against working forces directed principally along axes parallel to movement of the slide 17. A side face 28 of the die block face plate 26 extends generally at right angles to the working face 27 in a plane spaced laterally of the various die or tool stations 21-24. Holes 29 (FIG. 2) through the plate 26 receive knockout pins (not shown) for ejecting blanks from the tooling 25. The holes 29, in registration with respective tooling stations 21-24, extend from the working face 27 through the body of the die block face plate or back-up member 26, likewise along axes generally parallel to the direction of movement of the slide 17 and, at least with respect to the plate, provide means for defining such tool mounting stations.

The principal forces borne by tools 25, that is, punches, dies, and like tooling, on the plate 26 are thus directed along axes coincident with the axes of associated holes 29.

At each die station 21-24 there is formed in the face plate 26 a circular cavity 31 extending laterally, and preferably radially, to the axis of the hole 29 from a point adjacent the hole to the secondary face 28 of the plate 26. It is to be understood that the cavities 31 are spaced axially (with reference to the axes of the holes 29 and of the slide 17) from the working face 27 of the plate 26. Each cavity 31, originating and open at the secondary face 28, is generally cylindrical along a major portion of its length and defines by its imaginary axis a direction generally lateral or radial to the tool axis, as defined by the work station axis (21-24) of its associated hole 29. At its inner end 32, where it is most proximate the axis or center of the associated hole 29, the cavity has a tapered conical surface section 32 coaxial with the axis of the main cylindrical portion designated 33. The conical surface portion 32 is desirably defined by a relatively shallow angle, for example, 3°, with reference to the imaginary axis of the cylindrical main portion 33.

Assembled in each of the cavities 31 is a load sensing probe 36. The probe 36 is a generally circular body which extends along substantially the full length of the cavity 31. The probe 36 includes integral head, shoulder, stem, and sensing portions 37-40, respectively. The head 37 forms the major diameter of the probe 36 and is somewhat larger than the major diameter of the cavity 31 at the secondary face 28. The probe shoulder portion 38 provides a sliding fit with the cylindrical cavity area 33, while the stem portion 39 affords a clearance fit with this cylindrical cavity portion. An O-ring 43 disposed in a groove on the periphery of the probe shoulder portion 38 seals contaminants out of the cavity 31.

The sensing portion 40 at the inner end of the probe 36 is a generally flat projection having a thickness substantially less than the diameter of the probe at this area. The flat or planar sensing portion 40 is symmetrically disposed with respect to the imaginary axis of the remaining circular area of the probe 36. Opposite faces 46,47 of the sensing portion 40 are defined by parallel planes symmetrically spaced with respect to the imaginary axis of the remainder of the circular probe 36. Both the die block face plate 26 and the load sensing probe 36 are fabricated preferably of tool steel heat treated to a hardness of 58-68 on the Rockwell C scale.

A strain gauge 51 is attached to each face 46,47 of the sensing portion 40 by adhesive or other suitable well known means. The strain gauges 51 are of conventional construction and typically employ a conductive foil whose resistance changes as a function of the degree to which it is strained, i.e., stretched or compressed, in its plane. Electrical lead wires 52 are attached to each strain gauge 51 in a known manner. The wires 52 associated with one sensing face 46 are routed through a cross bore 53 through the sensing portion 40. Wires 52 from both gauges 51 are routed through a cylindrical hole 54 running parallel to the longitudinal axis of the probe 36 from the inner end of the stem 39 to the outer face of the head 37.

A pair of clamp blocks 58 are provided to retain the probe 36 in its respective cavity or bore 31. Each clamp block 58 includes, at one side, a projecting fulcrum 59 and, at another side, a retaining lip 60. A counterbore 61 through the block 58 receives a socket head clamp screw 62 threaded into the plate 26. Tightening of the screw 62 causes the lip 60 of the block 58 to pivot on the fulcrum 59 and, by engagement with the outer face of the probe head 37, to drive the probe 36 axially into the cavity 31.

The probe 36 is assembled in its respective cavity 31, with the plane of its sensing head 40 parallel to the axis of tool force, i.e., parallel to the tool station axis (21-24) of the hole 29. As the probe 36 is driven axially into the cavity 31, the sensing head 40 is compressed in a direction parallel to the planes of its faces 46,47 by wedge action between surface areas of the converging tapered section 32 of the cavity.

Surfaces 64 of the probe sensing portion 40 are arcuate segments of a cone having substantially the same dimensions as the receiving tapered section 32 of the cavity 31. Thus, these probe sensing portion surfaces 64 have a configuration which is complementary to the cone angle of the tapered cavity section 32.

The wedging action between the surfaces 64 and opposed areas of the tapered conical cavity section 32 is used to preload the probe sensing portion 40 into a state of compression even when the machine 10 is idle. The degree of preloading can be measured by the strain gauges 51 in a known manner, which involves the measurement of their resistances through the lead wires 52 from a point external to, and preferably remote from, the cavity 31. Once a desired level of preload of the probe sensing portion 40 has been achieved by tightening of the associated pair of screws 62, the gap between the underside of the probe head 37 and the secondary face 28 of the guide block face plate 26 may be measured with a feeler gauge or equivalent device. With this measurement, a spacer washer 66 having a thickness equal to this gap may be assembled between the head 37 and secondary surface 28 by first removing the clamp blocks 58 and the probe 36 to permit such washer to be assembled over the probe shoulder 38. With the spacer 66 in place, the blocks 58 are again installed and tightened by the screws 62.

Tool loading impressed on the block or tool back-up member 26 through the working face 27 in the vicinity of each hole 29 places the underlying material of the block or tool back-up member 26 in compression. This compression drives opposite sides or surface areas of the tapered cavity section 32 into a relative closing movement, caused by strain of the surrounding material of the block 26. This compressive strain is applied to the probe sensing portion 40 through the associated surfaces 64. The direction of this compression is in a plane parallel to the sensing portion faces 46,47. The strain experienced in the probe sensing portion 40 is proportional to the tool working forces applied at the face 27 on the block 26. The strain gauges 51, in a known manner, operate as a transducer to form electrical signals proportional to the strain experienced in the sensing portion 40. These electrical signals conducted through the wires 52 can be measured and monitored with conventional equipment well known in the art. Signals generated by the strain gauges 51 are operated upon by such electrical equipment to constantly monitor the operation of the machine. Actual signals can be compared with ideal signals to detect incipient tooling failures, poor adjustment, premature wear, imperfect workpieces, etc. to effectuate overall cost savings and improve product uniformity.

Any one or all of the probes 36 can be removed in a simple manner by unfastening the associated clamp blocks 58 for inspection, repair, or change of the strain gauges 51. Use of the spacer washer 66, matched to a particular probe and cavity set, allows immediate return of the probe to the previously determined preload or compression state of the probe sensing end 40 when the clamp blocks 58 are again drawn tight by the screws 62.

The elongate structure of the probe 36, with its sensing portion 40 occupying a relatively small space in the active area of the die block 26, is particularly adapted for use in machines where space is limited in the area to be monitored. The probe configuration is especially useful in applications like that disclosed where a plurality of die stations or like zones are provided on a common support or back-up plate. The disclosed elongated probe 36, by virtue of its arrangement in a similarly shaped receiving cavity, is discriminating in its measurement of the local loading at its associated die station, and avoids undue influence of varying loads at adjacent die stations. For this reason, a unitary support block and its attendant advantages can be employed in the support of tools at successive stations while still affording individual working force measurement at spaced stations.

Although the preferred embodiment of this invention has been shown and described, it should be understood that various modifications and rearrangements of the parts may be resorted to without departing from the scope of the invention as disclosed and claimed herein. For example, the thickness and/or sectional configuration of the probe sensing end 40 may be modified to alter the sensitivity of the probe. While the illustrated probes are mounted on the die breast 16, a stationary part of the machine, it should be understood that the probes can be mounted on movable parts of the machine, such as the slide 17, and that in such arrangements the probes are still considered to be mounted on the frame of the machine.

What is claimed is:

1. In a machine tool having a frame, a tool back-up member, the tool back-up member having a working face including means for defining a tool mounting station, said back-up member being constructed and arranged to support a tool during a working period by sustaining compressive loads through said face at the tool mounting station along an axis, a cavity having a boundary wall formed in said back-up member and extending relative to said axis laterally from a point underlying said face adjacent said mounting station to a point spaced from said mounting station, an elongated load sensing probe disposed in said cavity and extending longitudinally between said points, said sensing probe having an inner end in contact with an area of said boundary wall, and sensing means on said probe to form an electrical signal proportional to strain in said back-up member at said area of said cavity wall.

2. A machine tool as set forth in claim 1, wherein said back-up member includes a second face adjacent said second point, said second face being generally perpendicular to said working face.

3. A machine tool as set forth in claim 2, including means at said second face removably securing said probe to said back-up member.

4. A machine tool as set forth in claim 3, wherein said cavity is an elongated circular bore, said bore including a tapered section decreasing in radius in a direction away from said second face, said probe having a wedge portion including surface areas complementary to said cavity and disposed therein, said probe being axially constrained by said securing means and in a position wherein said wedge surface areas are in compression by contact with said tapered section.

5. A machine tool as set forth in claim 4, wherein said securing means includes means to axially urge said probe into said tapered section and develop the state of compression in said wedge portion.

6. A machine tool as set forth in claim 5, wherein said sensing means is constructed and arranged to monitor compression of said wedge portion.

7. A machine tool as set forth in claim 6, wherein said wedge portion is a generally planar web having a thickness substantially less than the effective diameter of said wedge portion.

8. A machine tool as set forth in claim 7, wherein said sensing means includes an electrical resistance type strain gauge means.

9. A machine tool as set forth in claim 8, wherein said strain gauge means is disposed on opposite sides of the web of said wedge portion.

10. A machine tool as set forth in claim 9, wherein the plane of the wedge portion web is parallel to the axis of the tool load.

11. In a machine tool having a frame, a tool backup member, the tool back-up member having a working face including means for defining a tool mounting station, said back-up member being constructed and arranged to support a tool during its working period by sustaining compressive loads through said face at the tool mounting station along an axis, a cavity having a boundary wall formed in said back-up member and extending relative to said axis laterally from a point underlying said face adjacent said mounting station to a point spaced from said mounting station, a sensing probe disposed in said cavity, said sensing probe having a portion in contact with an area of said boundary wall, said sensing probe including means to detect strain in said back-up member through contact with said boundary wall area, and means forcibly compressing said probe portion against said boundary wall area to assure reliable detection of strain in said back-up member.

12. A machine tool as set forth in claim 11, wherein compressing means includes a wedge surface means adjacent said probe portion.

13. A machine tool as set forth in claim 12, wherein said wedge surface means includes complementary converging surfaces on both said probe portion and said boundary wall.

14. A machine tool as set forth in claim 12, wherein said probe is an elongated member, said probe portion being adjacent an inner end thereof, the longitudinal axis of the probe extending laterally relative to the load axis.

15. In a device subjected to force loading along an imaginary line in a predetermined direction, including a member through which loads are applied, a cavity in said member adjacent the line of force loading, the boundary of said cavity including opposed surface areas facing towards one another, a load sensing probe disposed in said cavity, said load sensing probe including opposed surface areas facing away from one another, said sensing probe surface areas being in contact with said cavity surface areas, means normally compressing said sensing probe between said cavity surface areas, and transducer means on an area of said sensing probe compressed between said probe surfaces, said transducer means being capable of forming an electrical signal proportional to the state of compression in said probe intermediate said probe surface areas whereby loads impressed upon said intermediate area cause a relative change in the spacing between said probe surface areas and are reflected in a change in the signal formed as a result of a change in the level of compression in said intermediate area.

16. A device as set forth in claim 15, wherein said member includes a face for sustaining said loads, said cavity being spaced from said face in said body along the direction of said force, said sensing probe being a generally planar web such that its dimensions between said probe surfaces are substantially greater than its thickness, the plane of said web being in parallel alignment with the axis of said load.

17. A device as set forth in claim 16, wherein said surface areas of both said cavity and probe converge with a common angle, and means to cause said probe to be wedged into the cavity converging surfaces to effect compression therebetween.

18. In a machine tool having a frame, a unitary tool back-up member, the tool back-up member having a working face including means defining a plurality of spaced tool mounting stations, said back-up member including a secondary face spaced from said tool mounting stations and generally disposed at right angles to said working face, said back-up member being constructed and arranged to support tools at respective stations during working periods by sustaining compressive loads through associated areas of said working face substantially along parallel axes generally perpendicular to said face, a separate cavity in said back-up member associated with each of said tool mounting stations, said cavities extending substantially along mutually parallel axes laterally to said compressive load axes, each cavity laterally extending from a point underlying its associated tool mounting station to a point opening in said secondary face, a load sensing probe disposed in each of said cavities, said load sensing probes being of substantially identical construction, said probe being an elongated member of sufficient length to reach at its outer end from said secondary face to said underlying point at its inner end, said probe at its inner end being in contact with the wall of its associated cavity, said probe including means on its inner end to sense local strain in said body through contact with the wall of the cavity induced by tool loads imposed on said body at the respective tool mounting station.

19. A machine tool as set forth in claim 18, wherein said probe includes means for forming an electrical signal proportional to the tool load imposed upon said body at said respective tool mounting station.

20. A machine tool as set forth in claim 19, including clamping means on sid body member at said secondary face, said clamping means being operable to develop said contact between said probe and said cavity surfaces.

21. A machine tool having a frame, a unitary tool back-up member, the back-up member having a work face including means defining a plurality of tool mounting stations, said back-up member being constructed and arranged to support tools at said tool mounting stations during working periods of such tools by sustaining compressive loads through said work face at said tool mounting stations along axes generally perpendicular to said work face, said back-up member including a secondary face generally perpendicular to said work face and spaced laterally with respect to said axes, a cavity in said back-up member associated with each tool mounting station, said cavities each being spaced from said work face and extending from a point at an inner end adjacent its respective tool mounting station to an opening in said secondary face at its outer end, each cavity including at its inner end a conical bore converging in its radius in a direction away from said secondary face, a substantially identical load sensing probe in each cavity, said probe being an elongated body having sufficient length to extend from said conical bore to said secondary face, said probe having at its inner end a tapered section with a configuration complementary to said conical bore, means on said probe inner end to sense compression therein and form an electrical signal proportional to such compression, means adjacent said secondary face to axially urge said probe tapered section into wedging engagement with said conical bore and maintain a minimum level of compression therein, the relationship of said cavity to its tool mounting station being such that compressive forces on said work face at said station results in strain of the walls of said cavity conical bore, the relationship of said probe tapered section to said conical bore being such that strain induced in said bore by compressive forces at said tool mounting station result in compression of said probe tapered section, whereby said sensing means is responsive to working forces at its respective tool mounting station.

* * * * *